US009369965B2

(12) United States Patent
Yoneyama et al.

(10) Patent No.: US 9,369,965 B2
(45) Date of Patent: *Jun. 14, 2016

(54) COMMUNICATION APPARATUS

(71) Applicant: Kabushiki Kaisha Toshiba, Tokyo (JP)

(72) Inventors: Seijiro Yoneyama, Yokohama (JP); Kotaro Ise, Saitama (JP); Kiyoshi Toshimitsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 14/149,876

(22) Filed: Jan. 8, 2014

(65) Prior Publication Data
US 2014/0133338 A1 May 15, 2014

Related U.S. Application Data

(63) Continuation of application No. 13/071,311, filed on Mar. 24, 2011, now Pat. No. 8,761,137, which is a continuation of application No. PCT/JP2009/069496, filed on Nov. 17, 2009.

(30) Foreign Application Priority Data

Nov. 17, 2008 (JP) .................................. 2008-293503

(51) Int. Cl.
*H04W 4/00* (2009.01)
*H04B 1/00* (2006.01)
(Continued)

(52) U.S. Cl.
CPC .......... *H04W 52/0251* (2013.01); *H04W 74/06* (2013.01); *H04W 52/0274* (2013.01); *Y02B 60/50* (2013.01)

(58) Field of Classification Search
None
See application file for complete search history.

(56) References Cited

U.S. PATENT DOCUMENTS

2007/0223417 A1* 9/2007 Taki ............................. 370/328
2009/0303930 A1 12/2009 Ashley

FOREIGN PATENT DOCUMENTS

JP 11-055177 2/1999
JP 2004-336401 11/2004
(Continued)

OTHER PUBLICATIONS

"Wireless LAN MAC and PHY Specifications", IEEE Standard 802.11, 2007 Edition, Part 11, Section 11.2, pp. 425-436, (2007).
(Continued)

*Primary Examiner* — Chirag Shah
*Assistant Examiner* — Srinivasa Reddivalam
(74) *Attorney, Agent, or Firm* — Finnegan, Henderson, Farabow, Garrett & Dunner, L.L.P.

(57) ABSTRACT

The first wireless communication unit configured to wirelessly communicate with a first wireless apparatus on a first wireless network. The beacon transmitting unit cyclically transmits a beacon signal to the first wireless apparatus via the first wireless communication unit. The period determiner determines a transmission permission period during which data transmission by the first wireless apparatus is permitted. The notification unit notifies a control signal specifying the transmission permission period to the first wireless apparatus via the beacon signal. The power managing unit performs control so that power supply to the first wireless communication unit is suspended during a suspension period, the suspend period being a period except both the transmission permission period and a transmission timing period of the beacon signal within a whole period.

9 Claims, 8 Drawing Sheets

(51) Int. Cl.
 *H04W 52/02* (2009.01)
 *H04W 74/06* (2009.01)

(56) References Cited

FOREIGN PATENT DOCUMENTS

| JP | 2007-053542 | * | 1/2007 | ............... H04B 7/26 |
| JP | 2007-053542 | | 3/2007 | |
| JP | 2007-258943 | | 10/2007 | |

OTHER PUBLICATIONS

International Search Report from the Japanese Patent Office for International Application No. PCT/JP2009/069496, mailing date Feb. 16, 2010.

Chinese Office Action dated May 6, 2013, issued in Chinese Application No. 2009-80145524.7 (6 pages).

International Preliminary Report on Patentability and Written Opinion issued by the International Bureau of WIPO on Jun. 20, 2011, for International Application No. PCT/JP2009/069496.

The Second Notification of Opinions of the Examination issued by the State Intellectual Property Office of the People's Republic of China on Feb. 17, 2014, for Chinese Patent Application No. 200980145524.7, and English-language translation thereof.

The Second Notification of Opinions of the Examination issued by the State Intellectual Property Office of the People's Republic of China on Feb. 17, 2014, for Chinese Patent Application No. 2014021200750880, and English-language translation thereof.

* cited by examiner

| BASE STATION INFORMATION ACQUIRED FROM WIRELESS COMMUNICATION UNIT 9 | INTERFACE OPERATION STATE | DOWN |
|---|---|---|
| | RSSI | −80 (dBm) |
| | BER | 50 (%) |
| | FER | 50 (%) |
| | THE NUMBER OF WIRELESS TERMINAL CONNECTIONS | 5 (CONNECTIONS) |
| BASE STATION INFORMATION ACQUIRED FROM WIRELESS COMMUNICATION UNIT 10 | TRAFFIC VOLUME | 1000 (pps) |

FIG. 4

COMMUNICATION APPARATUS

CROSS REFERENCE TO RELATED APPLICATIONS

This application is a continuation application of U.S. application Ser. No. 13/071,311, filed Mar. 24, 2011, which is a continuation of PCT international Application PCT/JP2009/069496, filed on Nov. 17, 2009, which claims the benefit of priority from the prior Japanese Patent No. 2008-0293503, filed on Nov. 17, 2008, the contents of all of which are incorporated herein by reference.

FIELD

The embodiments of the present invention relate to a communication apparatus.

BACKGROUND

In the IEEE 802.11 wireless LAN standard, an infrastructure mode for a wireless terminal to connect to a wireless base station and perform communication via the wireless base station is provided, and furthermore, a power saving function (power save mode) for suppressing power consumption of the wireless terminal in the infrastructure mode Is defined (IEEE Std, 802.11-2007, "Wireless LAN Medium Access Control (MAC) and Physical Layer (PHY) Specifications"). This is a function to realize power saving not on the wireless base station side but on the wireless terminal side, and the function is intended to suppress power consumption by the terminal causing a wireless communication module to transition to a sleep state in synchronization with a beacon signal transmitted from the base station cyclically. Since the wireless terminal which has transitioned to the sleep state cannot receive data, the wireless base station temporarily buffers the data and gives a notification to that effect to the wireless terminal by including a TIM (Traffic Indication Map) in a beacon signals. The wireless terminal which has received the notification can receive the data from the wireless base station by performing polling to the wireless base station.

On the other hand, a method for realizing power saving of a wireless base station in the infrastructure mode is shown in JP-A 2004-336401 (Kokai). In general, a wireless base station in the infrastructure mode is required to always wait for data transmission from a wireless terminal though it is not known when the data transmission occurs. Therefore, there is a problem that the wireless base station cannot transition to a sleep state. JP-A2004-336401 proposes a method in which the wireless base station transitions to the sleep state by transmitting a CTS (Clear To Send) frame inhibiting transmission by a wireless terminal to the wireless terminal before transitioning to the sleep state.

In the related-art technique described above, each of the power-saving function on the wireless terminal side and the power saving function on the wireless base station side are shown. However, a method for causing both power saving functions to operate at the same time is not described. Recently, mobile terminals, such a notebook PC (Personal Computer) and a smartphone, are being multi-interfaced (3G, WiMAX, Wi-Fi and the like), and it is expected that there will be a demand for accessing the Internet via a mobile terminal by setting the mobile terminal as a wireless base station and connecting peripheral gadget equipment (a game machine, a music reproduction machine and the like). In such a configuration, both of the wireless base station and the wireless terminal are possibly mobile terminals the battery of which is limited. Therefore, it is important to concurrently realize power saving on both of a wireless base station and a wireless terminal constituting an infrastructure.

As described before, the power saving function of a wireless terminal provided in IEEE Std, 802.11-2007, "Wireless LAN Medium Access Control (MAC) and Physical Layer (PHY) Specifications" performs data transmission and receiving at a timing when the wireless terminal releases the sleep state. Therefore, in view of power saving of the wireless terminal, it is desirable to shorten the period during which data transmission and receiving is enabled and keep the period of the sleep state long. On the other hand, a system of inhibiting data transmission by a wireless terminal is adopted in JP-A2004-336401, and a CTS frame instructing inhibition is transmitted with the use of a CSMA/CA (Carrier Sense Multiple Access with Collision Avoidance) mechanism. Therefore, since the opportunity for a wireless terminal to transmit data and the opportunity for a wireless base station to transmit a CTS frame are equally maintained, there is a possibility that the wireless terminal receives a CTS frame before transmitting data. In this case, the wireless terminal cannot transition to a sleep state immediately, and a problem of reduction of the power saving effect is caused. Furthermore, JP-A2004-336401 proposes a control method of giving priority to the opportunity for a wireless terminal to transmit data by controlling a back-off time in a contention window. However, it is on the first transmission opportunity that this priority control acts, and a wireless terminal which transmits multiple data sequentially cannot avoid receiving a CTS frame before completing the transmission of the multiple data and cannot transition to a sleep state Immediately, Therefore, a problem of reduction of the power saving effect is caused similarly.

BRIEF DESCRIPTION OF THE DRAWINGS

FIG. 4 is a diagram showing an example of base station information;

DETAILED DESCRIPTION

According to one aspect of the present invention, there is provided with a communication apparatus.

The communication apparatus includes a first wireless communication unit, a beacon transmitting unit, a period determiner, a notification unit and a power managing unit.

The first wireless communication unit wirelessly communicates with a first wireless apparatus on a first wireless network.

The beacon transmitting unit cyclically transmits a beacon signal to the first wireless apparatus via the first wireless communication unit.

The period determiner determines a transmission permission period during which data transmission by the first wireless apparatus is permitted.

The notification unit notifies a control signal specifying the transmission permission period to the first wireless apparatus via the beacon signal.

The power managing unit performs control so that power supply to the first wireless communication unit is suspended during a suspension period, the suspend period being a period except both the transmission permission period and a transmission timing period of the beacon signal within a whole period.

Hereinafter, embodiments of the present invention will be described below with reference to drawings.

First Embodiment

Figure 1:
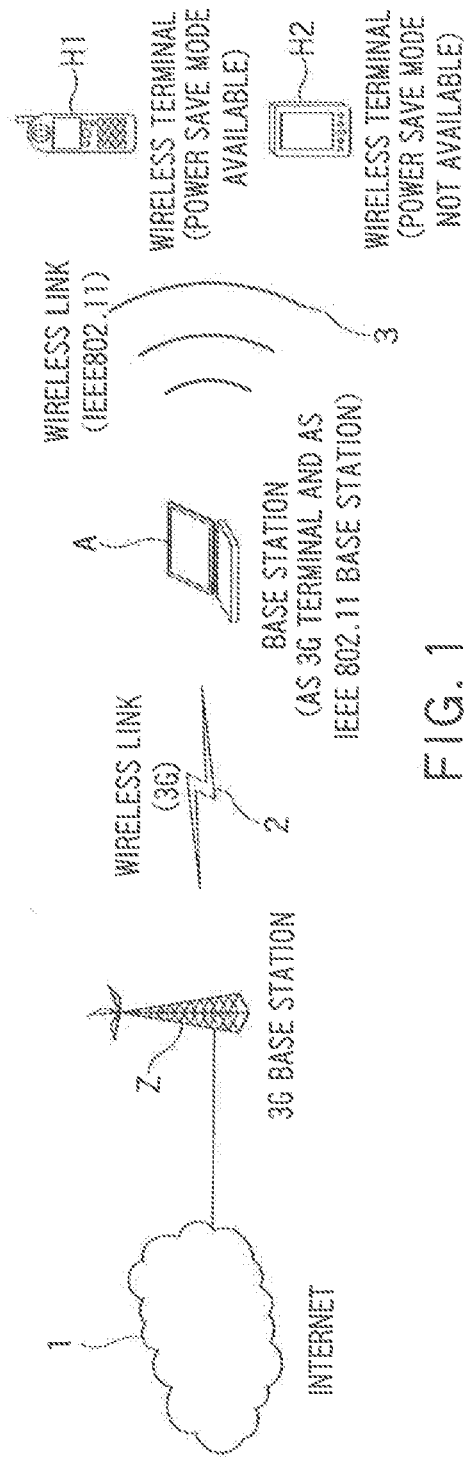
FIG. 1 is a diagram showing a configuration example of a communication system according to an embodiment of the present invention.

FIG. 1 shows a configuration example of a communication system according to an embodiment of the present invention.

In FIG. 1, reference numeral 1 denotes the Internet; Z denotes a 3G base station (second wireless apparatus) connected to the Internet 1, which is installed by a mobile phone provider; reference numeral 2 denotes a wireless link (second wireless link) provided by the 3G base station Z; and 3 denotes a wireless link (first wireless link) in accordance with the IEEE 802.11 standard.

Reference numeral A denotes a communication apparatus (base station) which operates both as a mobile phone terminal and an IEEE 802.11 wireless base station. The base station A operates as a mobile phone terminal for the wireless link 2 and as an IEEE 802.11 wireless base station for the wireless link 3.

Reference numerals H1 and H2 denote wireless terminals (first wireless apparatuses) connected to the base station A via the wireless link (first wireless link) 3. It is assumed that the power save mode in accordance with the IEEE 802.11 standard is available in the wireless terminal H1 but the power save mode is not available in the wireless terminal H2.

The base station (communication apparatus) A and the base station Z form a wireless network (second wireless network) in accordance with the 3G standard and wirelessly communicate with each other. The base station A and the wireless terminals H1 and H2 form a wireless network (first wireless network) in accordance with the wireless LAN of the IEEE 802.11 standard and wirelessly communicate with one another. The wireless terminals H1 and H2 can access the Internet 1 via the base station A.

Though FIG. 1 shows an example where two wireless terminals are connected to the wireless link 3, more than two wireless terminals may connect to the wireless link 3.

Figure 2:
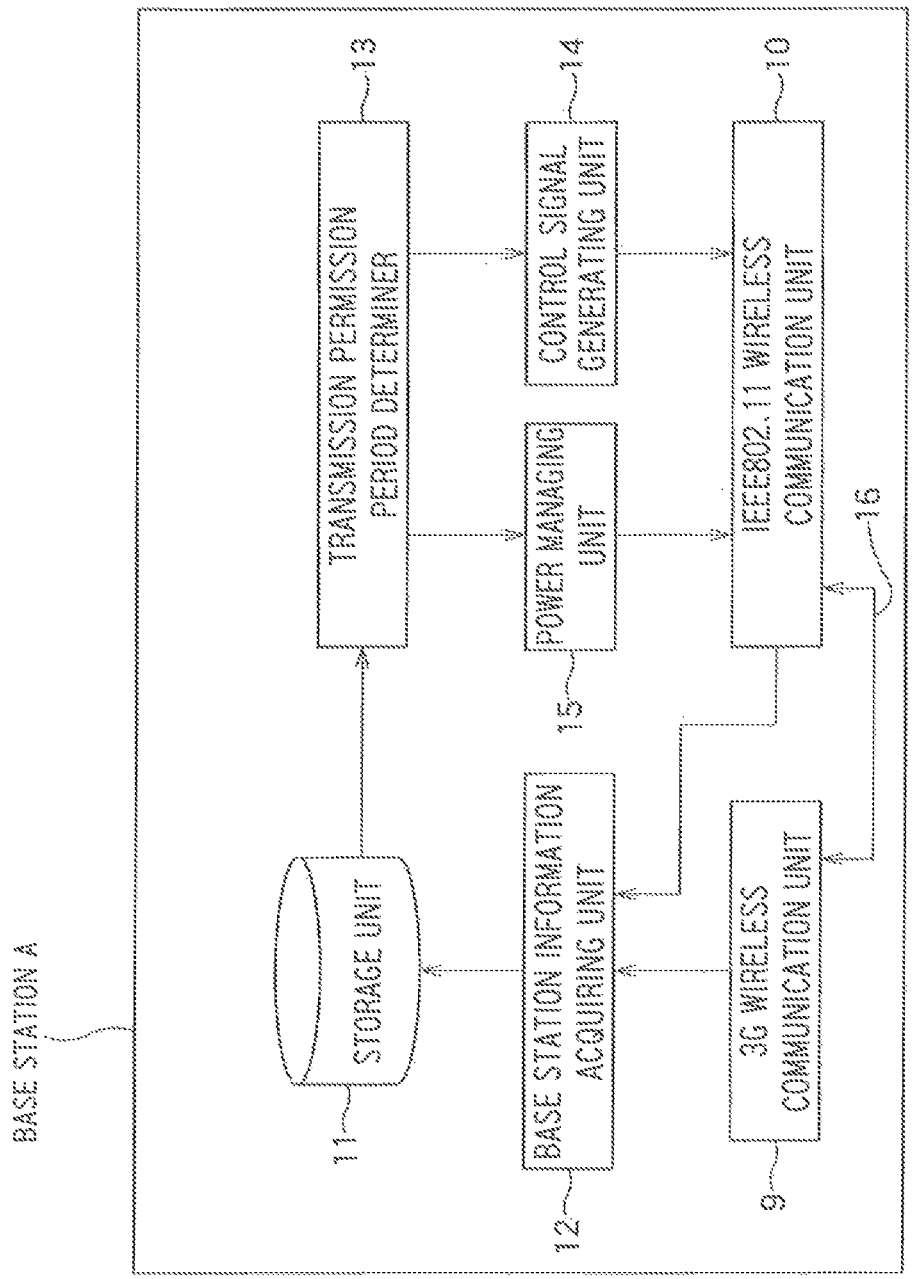
FIG. 2 is a block diagram showing a configuration example of a base station A.

FIG. 2 shows a configuration example of the base station (communication apparatus) A according to this embodiment.

The base station A is provided with a 3G wireless communication unit 9, an IEEE 802.11 wireless communication unit 10, a base station information acquiring unit 12, a storage unit 11, a transmission permission period determiner 13, a control signal generating unit 14, an power managing unit 15 and a bridge unit (relay unit) 16.

The 3G wireless communication unit (second wireless communication unit) 9 wirelessly communicates with the base station Z via the wireless link 2. The 3G wireless communication unit 9 hands over data destined to the wireless terminals H1 and H2, which it has received via the wireless link 2, to the IEEE 802.11 wireless communication unit 10 via the bridge unit 16.

The IEEE 802.11 wireless communication unit (first wireless communication unit) 10 wirelessly communicates with the wireless terminals H1 and H2 via the wireless link 3. The IEEE 802.11 wireless communication unit 10 stores data handed over from the 3G wireless communication unit 9 via the bridge unit 16, into an internal buffer, and transmits the data in the buffer to the wireless terminals H1 and H2 in accordance with a necessary procedure. When receiving data destined to an apparatus on the Internet, from the wireless terminal H1 or H2, the IEEE 802.11 wireless communication unit 10 hands it over to the 3G wireless communication unit 9 via the bridge unit 16. The 3G wireless communication unit 9 transmits the handed-over data via the wireless link 2. The IEEE 802.11 wireless communication unit 10 transmits a beacon signal (control signal) generated by the control signal generating unit 14 for each predetermined cycle, to the wireless terminals H1 and H2.

The bridge unit 16 relays communication between the LAN network in accordance with the IEEE 802.11 (first wireless network) and the wireless network in accordance with the 3G standard (second wireless network) by performing bridging between the 3G wireless communication unit 9 and the IEEE 802.11 wireless communication unit 10.

The base station information acquiring unit 12 acquires base station information (see FIG. 4 to be described later), which is information about the state of the wireless links 2 and 3. The base station information about the wireless link 3 is especially referred to as first link information, and the information about the wireless link 2 is especially referred to as second link information. The base station information acquiring unit 12 is provided with a first information acquiring unit for acquiring the first link information and a second information acquiring unit for acquiring the second link information.

The storage unit 11 stores the base station information (first and second link information) acquired by the base station information acquiring unit 12 inside.

The transmission permission period determiner 13 sets a transmission permission period during which data transmission by the wireless terminals H1 and H2 is permitted, in accordance with the base station information in the storage unit 11. The setting of the transmission permission period is performed, for example, during each beacon interval period between transmission of a beacon signal and transmission of the next beacon signal. For example, the starting point of the transmission permission period is the starting point of the beacon interval period. The length of the period may be calculated for each beacon interval period or may be calculated for each set of multiple beacon interval periods.

The control signal generating unit (beacon transmitting unit, notifying unit) 14 generates a beacon signal with a predetermined cycle, and transmits the generated beacon signal via the IEEE 802.11 wireless communication unit 10, with a control signal specifying the transmission permission period included in the beacon signal. Thereby, a wireless terminal which has received the beacon signal performs data transmission only during the transmission permission period specified by the beacon signal within the beacon interval period and suspends data transmission (data receiving is not inhibited) during the remaining period (transmission inhibition period) other than the transmission permission period.

The power managing unit 15 performs control so that power is supplied to the IEEE 802.11 wireless communication unit 10 during the transmission permission period and a beacon transmission timing period, and power supply to the IEEE 802.11 wireless communication unit 10 is suspended during the remaining whole period (suspension period) other than the transmission permission period and the beacon transmission timing period within a communication period.

Each of the components 9, 10, 11, 12, 13, 14, 15 and 16 in FIG. 2 may be configured by hardware or may be configured as a software module to be executed on the base station A.

Figure 3:
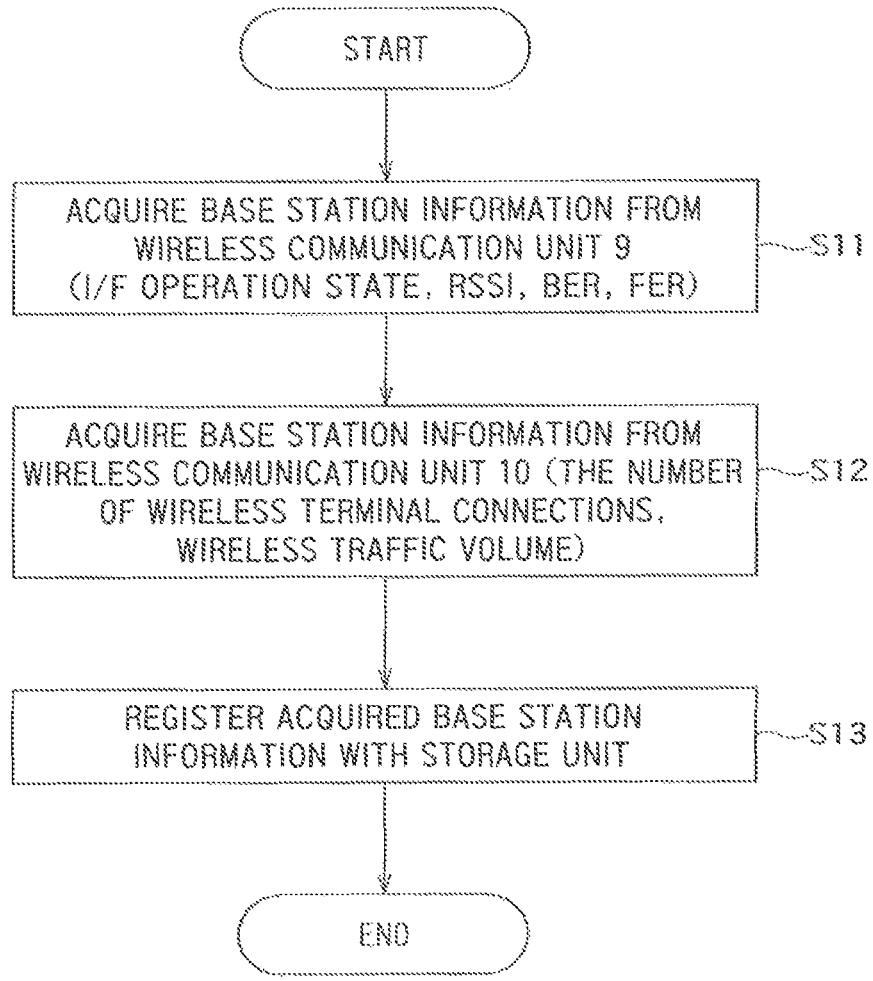
FIG. 3 is a flowchart showing the process flow of the operation of a base station information acquiring unit.

FIG. 3 is a flowchart showing an example of the process procedure of the base station information acquiring unit 12.

First, the base station information acquiring unit 12 acquires base station information (second link information) about the state of the wireless link 2 from the 3G wireless communication unit 9 (S11). This base station information includes an interface operation state indicating whether connection with the wireless link 2 is established or disconnected (for example, interface up/down information set by the OS) and statistical information about the communication quality of the wireless link 2. As the statistical information, there are, for example, RSSI (Received Signal Strength Indicator), BER (Bit Error Rate), FER (Frame Error Rate) or the like.

Next, the base station information acquiring unit 12 acquires base station information (first link information) about the state of the wireless link 3 from the IEEE 802.11 wireless communication unit 10 (S12). This base station information includes statistical information about the use state of the wireless link 3. As this statistical information, there are, for example, the number of wireless terminal connections, traffic volume per unit time and the like. The traffic volume is indicated by the amount of data or the number of packets communicated through the wireless link 3 per unit time and expressed, for example, by the unit of bps (bit per second) or pps (packets per second). The number of wireless terminal connections and the wireless traffic volume per unit time are peculiar statistical information which can be known only by the base station in the infrastructure mode.

At the end, the base station information acquiring unit 12 registers the acquired base station information with the storage unit 11 (S13). An example of the base station information is shown in FIG. 4.

Figure 5:
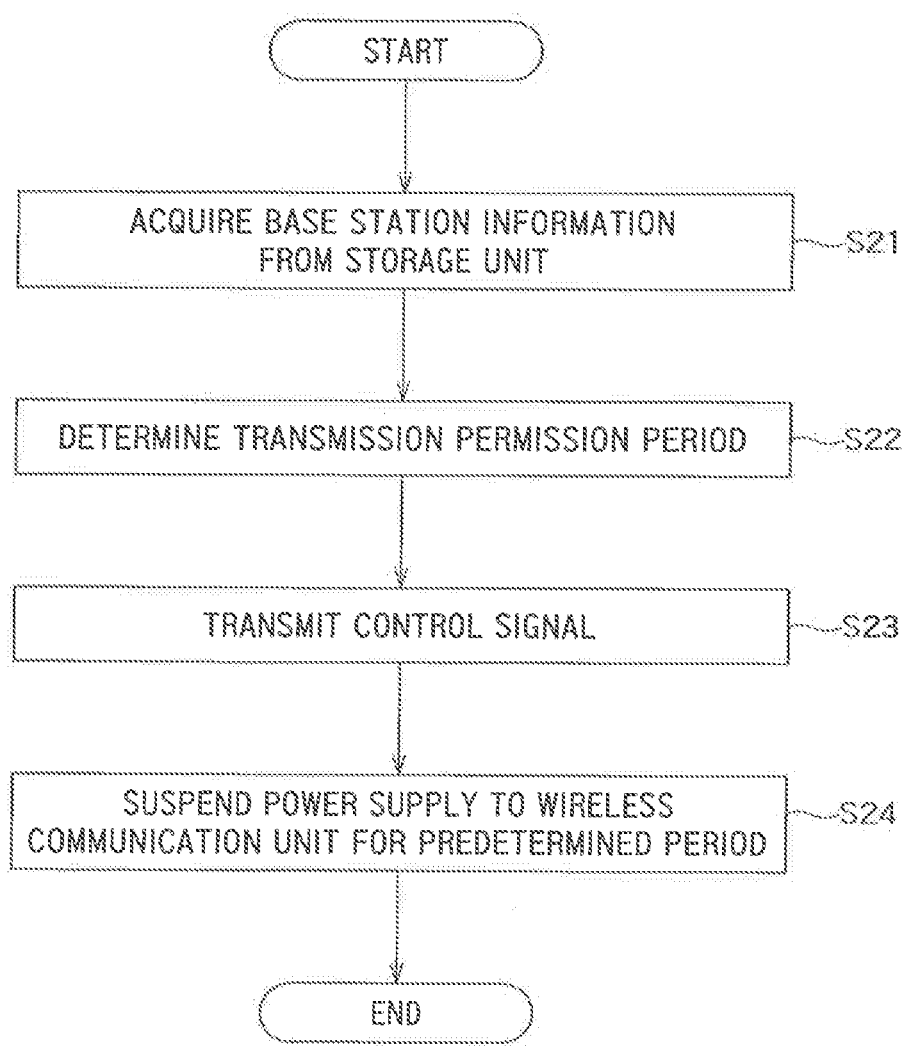
FIG. 5 is a flowchart showing the flow of operations of a transmission permission period determiner, a control signal generating unit and a power managing unit.

FIG. 5 is a flowchart showing an example of the process procedure of the transmission permission period determiner 13, the control signal generating unit 14 and the power managing unit 15.

First, the transmission permission period determiner 13 acquires base station information from the storage unit 11 (S21), calculates a transmission permission period length from the acquired base station information, and determines a period with the transmission permission period length as a transmission permission period within a beacon interval period (S22). Here, a continuous period corresponding to the transmission permission period length starting from the starting point of the beacon interval period is determined as the transmission permission period. Then, the control signal generating unit 14 generates a beacon signal which includes a control signal specifying the determined transmission permission period (that is, a control signal permitting data transmission during the transmission permission period within the beacon interval period and instructing inhibition of data transmission during a transmission inhibition period other than the transmission permission period) and transmits the beacon signal (S23).

Here, it is assumed that the base station A internally manages a reference value of the transmission permission period length, and the reference value is, for example, 100 msec in this embodiment. This reference value may be such that can be changed by an administrator accessing the GUI of the base station A using a web browser or the like. An example of calculation of the transmission permission period length corresponding to base station information will be shown below.

<Examples of Calculation of Transmission Permission Period Length>

(1) Example of Calculation of Transmission Permission Period Length Based on Interface Operation State If the interface operation state of the 3G wireless communication unit 9 is DOWN, data transmitted by the wireless terminals and H2 connected to the wireless link 3 is discarded inside the base station A. That is, it is desirable to suppress the opportunity for the wireless terminals H1 and H2 to transmit data as mush as possible when the interface operation state is DOWN. Therefore, for example, a rule is set that the transmission permission period length is set to the minimum value. Here, it is assumed that the minimum value is internally managed by the base station A and is, for example, 10 msec. This minimum value may be such that can be changed by the administrator accessing the GUI of the base station A using a web browser or the like. In the example in FIG. 4 where the interface operation state is DOWN, the transmission permission period length is the minimum value of 10 msec.

(2) Example of Calculation of Transmission Permission Period Length Based on RSSI When the RSSI of the wireless link 2 for access to the Internet significantly decreases, a lot of communication data is lost in the wireless link 2, and communication becomes impossible. That is, it is desirable to suppress the opportunity for the wireless terminals H1 and H2 to transmit data as mush as possible when the RSSI significantly decreases. Therefore, for example, a rule is set that the transmission permission period length is set to the minimum value if the RSSI decreases below a predetermined threshold. Here, it is assumed that the threshold and the minimum value are internally managed by the base station A and are, for example, −70 dBm and 10 msec, respectively, in this embodiment. The threshold and the minimum value may be such that can be changed by the administrator accessing the GUI of the base station A using a web browser or the like. In the example in FIG. 4 where the RSSI is −80 dBm, the transmission permission period length is the minimum value of 10 msec because the RSSI is below the threshold of −70 dBm.

(3) Example of Calculation of Transmission Permission Period Length Based on BER When the BER of the wireless link 2 for access to the Internet significantly increases, a lot of communication data is lost in the wireless link 2, and communication becomes impossible. That is, it is desirable to suppress the opportunity for the wireless terminals H1 and H2 to transmit data as mush as possible when the BER significantly increases. Therefore, for example, a rule is set that the transmission permission period length is set to the minimum value if the BER exceeds a predetermined threshold. Here, it is assumed that the threshold and the minimum value are internally managed by the base station A and are, for example, 10% and 10 msec, respectively, in this embodiment. The threshold and the minimum value may be such that can be changed by the administrator accessing the GUI of the base station A using a web browser or the like. In the example in FIG. 4 where the BER is 50%, the transmission permission period length is the minimum value of 10 msec because the BER is above the threshold of 10%.

(4) Example of Calculation of Transmission Permission Period Length Based on FER When the FER of the wireless link 2 for access to the Internet significantly increases, a lot of communication data is lost in the wireless link 2, and communication becomes impossible. That is, it is desirable to suppress the opportunity for the wireless terminals H1 and H2 to transmit data as mush as possible when the FER significantly increases. Therefore, for example, a rule is set that the transmission permission period length Is set to the minimum value if the FER exceeds a predetermined threshold. Here, it is assumed that the threshold and the minimum value are internally managed by the base station A and are, for example, 10% and 10 msec, respectively, in this embodiment. The threshold and the minimum value may be such that can be changed by the administrator accessing the GUI of the base station using a web browser or the like. In the example in FIG. 5 where the FER is 50%, the transmission permission period length is the minimum value of 10 msec because the FER is above the threshold of 10%.

(5) Example of Calculation of Transmission Permission Period Length Based on the Number of Wireless Terminal Connections With increase in the number of wireless terminal connections, the traffic volume of the wireless link 3 may possibly increase. If the transmission permission period length is not extended as the traffic volume increases, data may be possibly discarded inside the base station A and the wireless terminals H1 and H2. Therefore, for example, a rule is set that the transmission permission period length is extended by 20 msec for each wireless terminal. In the example in FIG. 5 where the number of wireless terminal connections is five, the transmission permission period length of 200 msec is obtained by calculating "reference value 100 msec+the number of wireless terminals of 5×20 msec".

(6) Example of Calculation of Transmission Permission Period Length Based on Traffic Volume If the transmission permission period length is not extended as the traffic volume increases, data may be possibly discarded inside the base station A and the wireless terminals H1 and H2, Therefore, for example, a rule is set that the transmission permission period length is extended by 20 msec per the traffic volume of 200 pps. In the example in FIG. 4 where the traffic volume is 1000 pps, the transmission permission period length of 200 msec is obtained by calculating "reference value 100 msec traffic volume 1000 pps 200 pps×20 msec".

Here, the examples of calculating the transmission permission period length from one of various pieces of base station information have been described. However, the transmission permission period length may be calculated by combining multiple pieces of base station information as described below.

For example, in the case of combining the calculation examples (1), (2), (3) and (4) in which the transmission permission period length is set to the minimum value, a method can be adopted in which the transmission permission period length is set to the minimum value if any one of the minimum value conditions is satisfied among the condition that the interface operation state is DOWN, the condition that the RSSI is below a threshold, the condition that the FER is above a threshold, and the condition that the BER is above a threshold.

In the case of combining the calculation examples (5) and (6) in which the transmission permission period length is extended, a method can be adopted in which the transmission permission period length is extended by 20 msec for each wireless terminal, and furthermore, the transmission permission period length is extended by 20 msec per the traffic volume of 200 pps. For example, in the example in FIG. 4 where the number of wireless terminal connections is five and the traffic volume is 1000 pps, the transmission permission period length of 300 msec is obtained by calculating "reference value 100 msec+the number of wireless terminals of 5×20 msec+traffic volume 1000 pps 200 pps×20 msec".

In the case of combining at least one of the examples (1), (2), (3) and (4) in which the transmission permission period length is set to the minimum value and at least one of the examples (5) and (6) in which the transmission permission period length is extended, priority is given to the calculation result of the former. Therefore, any one of the above minimum value conditions corresponding to the examples (1), (2), (3) and (4) is satisfied, the transmission permission period length is set to the minimum value. In this case, no matter what values the number of wireless terminal connections and the traffic volume indicate, the calculations of the examples (5) and (6) are not performed, and the transmission permission period length is not extended.

The power managing unit 15 performs control so that power is supplied to the IEEE 802.11 wireless communication unit 10 during a beacon signal transmission timing period and the transmission permission period determined as described above, and power supply to the IEEE 802.11 wireless communication unit 10 is suspended during a suspension period other than the transmission permission period and the beacon transmission timing period within the communication period.

Subsequently, the base station A repeats S21 to S24 cyclically.

A specific process flow of steps S23 and S24 will be described below in more detail with reference to FIG. 6.

Figure 6:
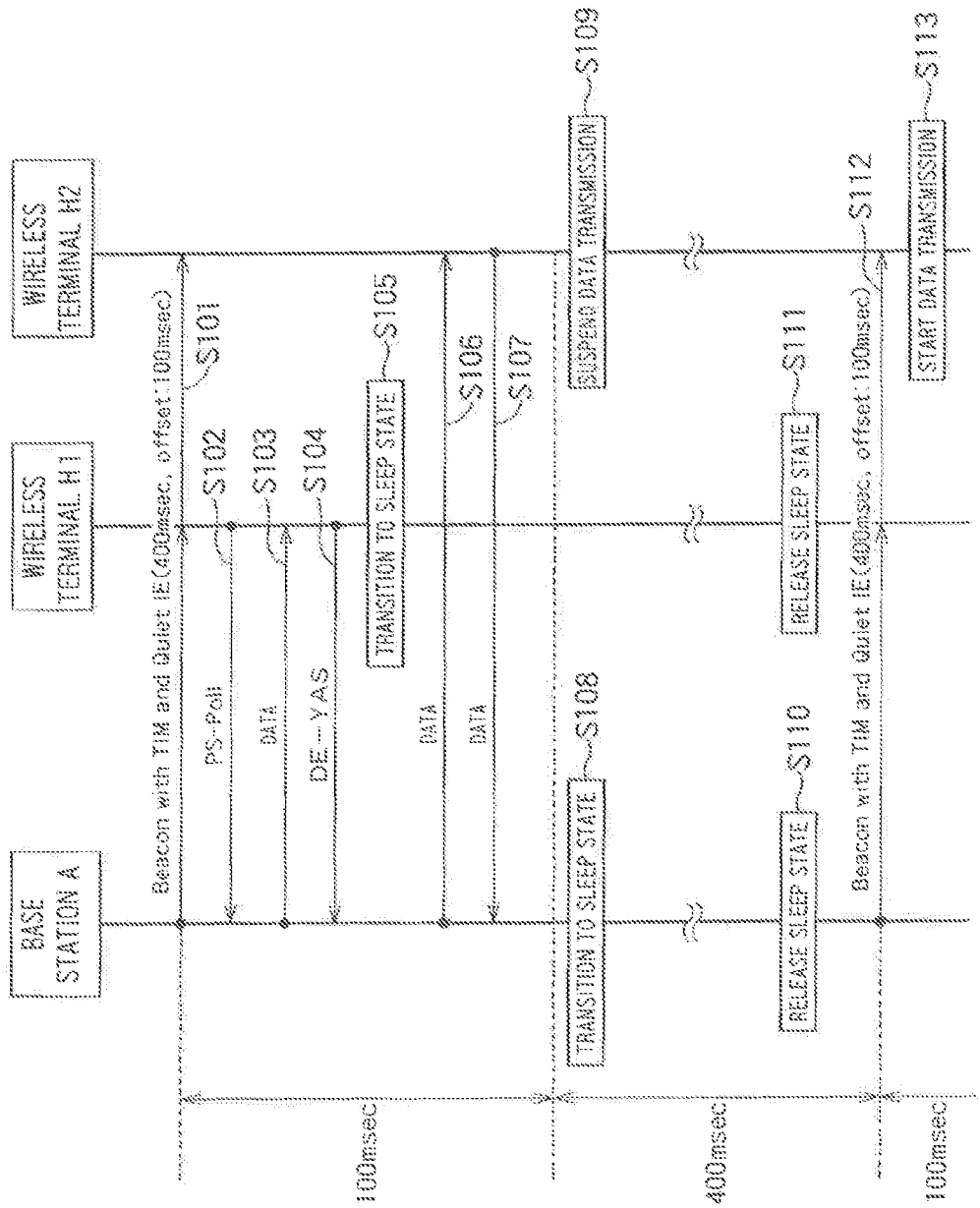
FIG. 6 is a diagram showing an example of the flow of a process of transmitting and receiving control signals and data among the base station A, a wireless terminal H1 and a wireless terminal H2.

FIG. 6 shows an example of the flow of a process of transmitting and receiving control signals and data among the base station A, the wireless terminal H1 and the wireless terminal H2 in FIG. 1.

In this example, a beacon signal which includes a Quiet IE (Quiet Information Element) field provided in IEEE 802.11 is used as a beacon signal. This field includes a field for specifying an offset time to start inhibition of data transmission (a Quiet Offset field) and a field for specifying an inhibition time required before releasing the inhibition of data transmission (a Quiet Duration field). When this beacon signal is used, the control signal is a data signal of the Quiet Duration field and the Quiet Offset field of the Quiet IE, and the transmission permission period determiner 13 sets a transmission permission period by calculating an offset time and an inhibition time. Here, it is assumed that the transmission cycle of the beacon signal is set to 500 msec, and the offset time and the inhibition time are calculated as 100 msec and 400 msec obtained by subtracting the offset time from the transmission cycle of the beacon signal, respectively. It is also assumed that the power save mode is available in the wireless terminal H1, and the power save mode is not available in the wireless terminal H2.

Figure 7:
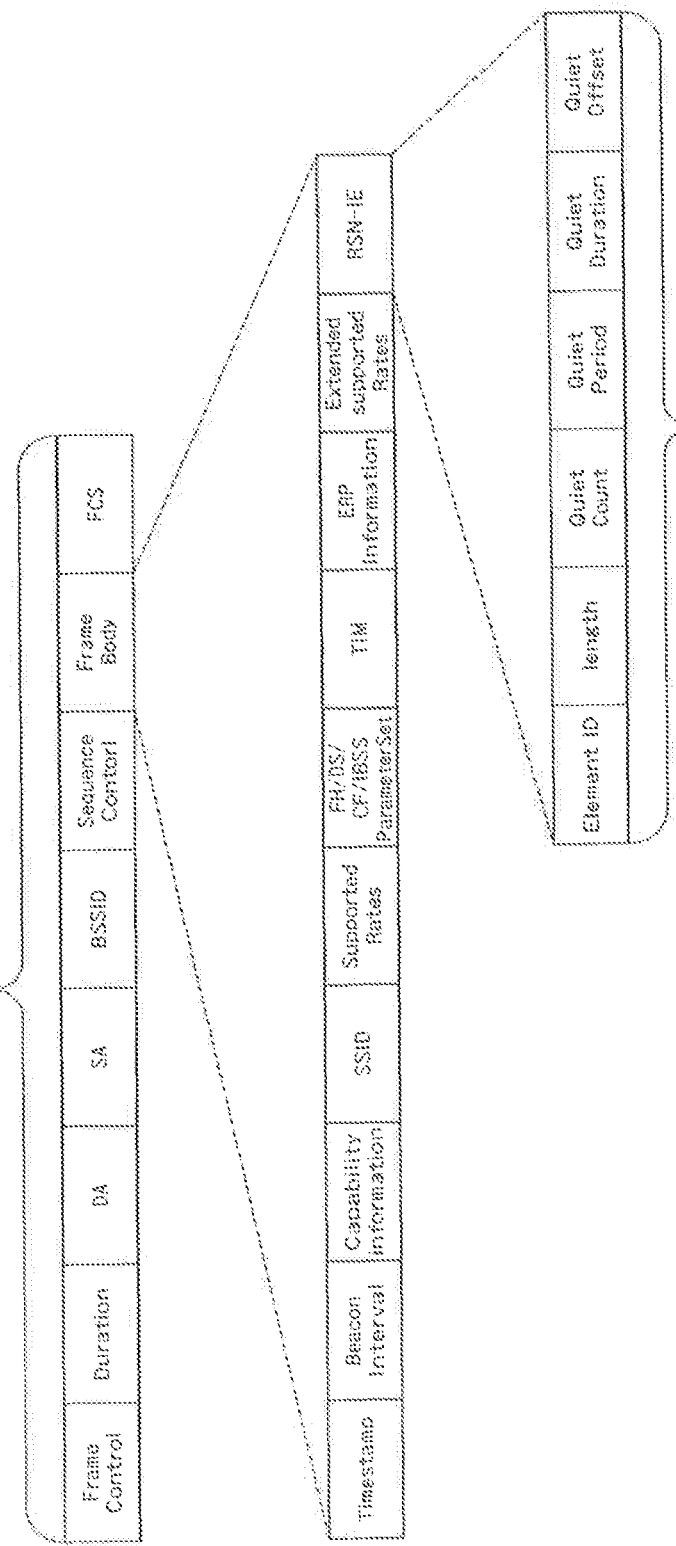
FIG. 7 is a diagram showing the form of a beacon signal.

First, the base station A transmits a beacon signal which includes a TIM notifying that there is data (for example, data which has arrived from the Internet 1) destined to the wireless terminal H1 and a Quiet IE (S101) The form of the beacon signal is shown in FIG. 7. In the Quiet Duration field of the Quiet IE, 400 msec is set, and 100 msec is set in the Quiet Off field. Thereby it is possible to permit the wireless terminals H1 and H2 which have received the beacon signal to transmit data during a period of 100 msec (offset time) after the receipt (i.e., during transmission permission period) and cause them to suspend data transmission during a transmission inhibition period before elapse of more 400 msec after the elapse of 100 msec (400 corresponds inhibition time). According to the beacon signal transmitted at S101, data transmission is not inhibited after the lapse of 400 msec.

The base station A can calculate parameters such as the Quiet Duration and the Quiet Off (that is, the inhibition time and the offset time) each time a beacon signal is transmitted. Here, it is possible to set the inhibition time set for the Quiet Duration longer than the transmission cycle of the beacon signal. In this case, even if a wireless terminal cannot receive the next beacon signal due to radio wave interference or the like, it is possible to cause the wireless terminal to suppress data transmission until transmission of the beacon signal after the next.

Here, the beacon signal is a control signal intended for a base station to cyclically announce the existence and availability of a wireless link to a wireless terminal, and the wireless terminal which has transitioned to the power save mode releases the sleep state in synchronization with the transmission cycle of the beacon signal to certainly perform receiving processing of the beacon signal. Thus, the method of notifying a transmission permission period by a beacon signal can be said to be the most suitable method to certainly notify information to a wireless terminal in comparison with the notification method shown in 3P-A2004-336401.

The wireless terminals H1 and H2 which have received the beacon signal are permitted to perform data transmission until 100 msec (offset time) has elapsed. Receiving the notification of buffering of the data destined to the wireless terminal H1, from the base station A at S101, the wireless terminal H1 transmits a PS-Poll provided in the IEEE 802.11 standard to poll the base station A, receives the data destined to the wireless terminal H1 from the base station A, and transmits data to the base station A as needed (S102 to S104). The wireless terminal H1 in which the power save mode is available transitions to a sleep state after performing transmission/receiving of the data (S105). The wireless terminal H2 in which the power save mode is not available performs transmission/receiving of data during the offset time (during the transmission permission period) (S106 and S107).

The order of the data transmission/receiving process shown in FIG. 6 is an example. Actually, data is transmitted and received in order determined by a CSMA/CA mechanism.

When 100 msec (offset time) has elapsed after transmission of the beacon signal, the base station A transitions to a sleep state (S108), and the wireless terminal H2 suspends data transmission (S109). Furthermore, when a transmission timing period for transmitting the next beacon signal starts, the base station A releases the sleep state (S110 and S111) and transmits the beacon signal (S112). On the other hand, when 100 msec (offset time) has elapsed after receiving of the beacon signal, the wireless team in H1 releases the sleep state 111 (S111) to receive the next beacon signal (S112) immediately before more 400 msec elapses. The same control signal as previously set is set for this next beacon signal. When receiving this next beacon signal, the wireless terminal H2 resumes transmission/receiving of data during the offset time (S113).

In this embodiment, a period corresponding to a transmission permission period length from the starting point of a beacon interval period is determined as a transmission permission period. However, the transmission permission period may be divided and set within the beacon interval period. For example, when the transmission permission period length is 200 msec, the offset time and the inhibition time are set to 100 msec and 300 msec, respectively, in the example in FIG. 6. A period corresponding to the offset time of 100 msec and a period corresponding to 100 msec after elapse of the inhibition time until transmission of the next beacon signal may be set as the transmission permission period.

As described above, it is possible for the base station A to transition to a sleep state and suppress power consumption during a cycle period of a beacon signal transmitted with a predetermined cycle. The wireless terminal H1 in which the power save mode is available can transition to a sleep state immediately after transmission/receiving of desired data and suppress power consumption, and the wireless terminal H2 in which the power save mode is not available can suppress power consumption by suspending data transmission during the inhibition time after the offset time. Thus, the base station A, the wireless terminal H1 and the wireless terminal H2 can suppress power supply at the same time.

Second Embodiment

In the first embodiment, the Quiet Duration field and the Quiet Offset filed of a Quiet IE are used to control data transmission of a wireless terminal. In this embodiment, description will be made on the case of controlling data transmission using a CF-Poll control signal and a CF-ACK+CF-End control signal provided in the IEEE 802.11 standard. The block diagram and the operation flow diagram of a base station in this embodiment are the some as those in the first embodiment. Especially, this embodiment is different from the first embodiment in the operation of the control signal generating unit 14. The difference from the first embodiment will be described below.

The control signal generating unit (data transmission controlling unit) 14 in this embodiment transmits a transmission permission frame (control signal) permitting data transmission and a transmission inhibition frame (control signal) inhibiting data transmission in this order to each of the wireless terminal H1 and the wireless terminal H2 separately via the IEEE 802.11 wireless communication unit 10 during a transmission permission period. Thereby, the control signal generating unit 14 performs control so that the wireless terminals H1 and H2 perform data transmission only during the period from when the wireless terminals H1 and H2 receive the transmission permission frame until they receive the transmission inhibition frame. The wireless terminals H1 and H2 cannot perform data transmission after receiving the transmission inhibition frame until receiving a transmission permission frame again.

Figure 8:
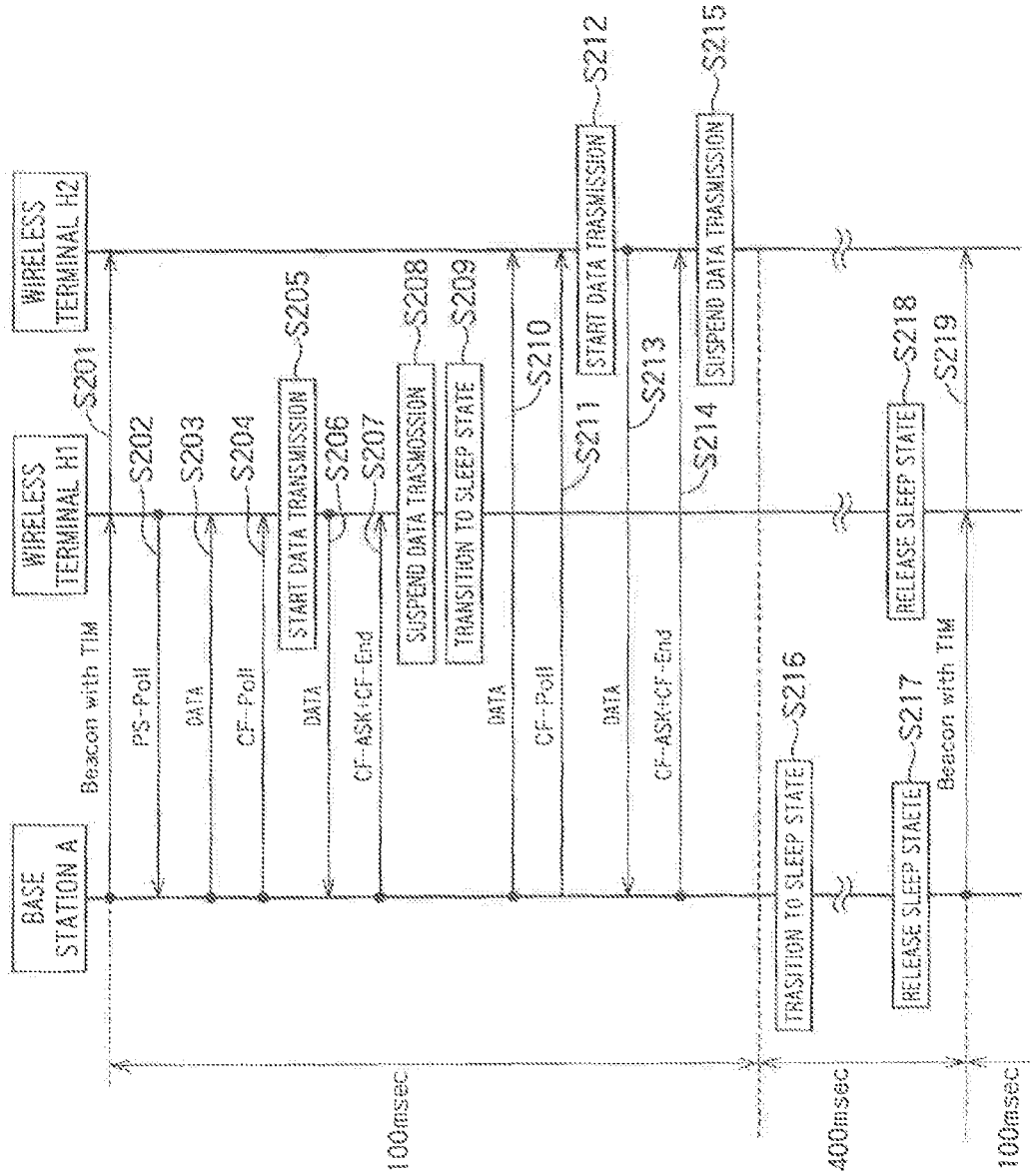
FIG. 8 is a diagram showing another example of the flow of the process of transmitting and receiving control signals and data among the base station A, the wireless terminal H1 and the wireless terminal H2.

FIG. 8 shows an example of a specific process flow of S23 and S24 in the case where a CF-Poll control signal (transmission permission frame) and a CF-ACK+CF-End control signal (transmission inhibition frame) are used as control signals. The CF-Poll control signal is a signal instructing start of data transmission and corresponds, for example, to the transmission permission frame described above. The CF-ACK+CF-End control signal is a signal which indicates positive acknowledgement of data receiving and, at the same time, instructs suspension of data transmission, and it corresponds, for example, to the transmission inhibition frame described above. It is assumed that the transmission permission period corresponds to continuous 100 msec from the starting point of a beacon interval period, and that the transmission cycle of a beacon signal is set to 500 msec. It is also assumed that the power save mode is available in the wireless terminal H1, and the power save mode is not available in the wireless terminal H2.

First, the base station A transmits a beacon signal which includes a TIM notifying that there is data destined to the wireless terminal H1 (S201).

Next, the base station A performs data transmission/receiving with the wireless terminals H1 and H2 until 100 msec has elapsed after transmission of the beacon signal. More specifically, when receiving a notification of buffering of data from the base station A by the TIM, the wireless terminal H1 in which the power save mode is available transmits a PS-Poll signal to the base station A and receives the data (S202 and S203). Triggered by receiving of a CF-Poll control signal (transmission permission frame) from the base station A, the wireless terminal H1 performs data transmission (S204, S205 and S206). That is, permission of data transmission is given by the base station A performing polling with a CF-Poll control signal. By transmitting a CF-ACK+CF-End control signal to the wireless terminal H1 after receiving the data from the wireless terminal H1, the base station A notifies the wireless terminal H1 of positive acknowledgement of receiving of the data and, at the same time, instructs the wireless terminal H1 to suspend (inhibit) data transmission (S207). The wireless terminal H1 which has received the CF-ACK+ CF-End control signal suspends data transmission (S208). The wireless terminal H1 in which the power save mode is available transitions to a sleep state after suspending data transmission (S209).

The wireless terminal 112 in which the power save mode is not available receives data from the base station A (S210), and performs data transmission being triggered by receiving of a CF-Poll control signal from the base station A (S211, S212 and S212). By transmitting the CF-ACK+CF-End control signal to the wireless terminal H2, the base station A notifies the wireless terminal H2 of positive acknowledgement of receiving of the data and instructs the wireless terminal H2 to suspend data transmission. The wireless terminal H2 which has received the CF-ACK+CF-End control signal suspends data transmission (S215).

The order of the data transmission/receiving process shown in FIG. 8 is an example. Actually, data is transmitted and received in order determined by a CSMA/CA mechanism.

When 100 msec (offset time) has elapsed after transmission of the beacon signal, the base station A transitions to a sleep state (S216), releases the sleep state during the transmission timing period of the next beacon signal (S217), and transmits the beacon signal (S219). On the other hand, the wireless terminal H1 in the sleep state releases the sleep state 111 to receive the next beacon signal (S218).

As described above, it is possible for the base station A to transition to a sleep state to suppress power consumption. The wireless terminal H1 in which the power save mode is available can transition to a sleep state immediately after transmission/receiving of desired data and suppress power consumption, and the wireless terminal H2 in which the power save mode is not available can suppress power consumption by suspending data transmission after the offset time. Thus, the base station A, the wireless terminal H1 and the wireless terminal H2 can suppress power consumption at the same time. As described above, according to the embodiments of the present invention, it is possible to provide means for realizing power saving of a base station and a wireless terminal at the same time in the infrastructure mode of a wireless system.

As described above, according to each embodiment of the present invention, it is possible to realize power saving of a communication apparatus (base station) and a wireless terminal at the same time.

What is claimed is:

1. A wireless terminal, comprising:
a first wireless communication apparatus connected to a first wireless network wherein the first wireless communication apparatus comprises a unit transmitting a beacon including information on a first period length, is in a first state at least during a period of the first period length from a transmission timing of the beacon, enables to transition to a second state after elapse of the period until a next transmission timing of the beacon, the first state is a state in which the first wireless communication apparatus enables to receive data from the first wireless network and the second state is a state in which the first wireless communication apparatus is restricted to receive the data from the first wireless network, and consumption power of the first wireless communication apparatus in the second state is lower than that of the first wireless communication apparatus in the first state;
a second wireless communication apparatus connected to a second wireless network different from the first wireless network;
a relay unit to relay communication between the first wireless communication apparatus and the second wireless communication apparatus;
an acquiring unit to acquire a state of a wireless link of the second wireless communication apparatus connected to the second wireless network; and
a determiner to determine the first period length based on the state of the wireless link of the second wireless communication apparatus as acquired by the acquiring unit.

2. The wireless terminal according to claim 1, further comprising a setting unit configured to set information to determine the first period length.

3. The wireless terminal according to claim 1, further comprising:
an acquiring unit configured to acquire a state of a wireless link of the first wireless communication apparatus on the first wireless network; wherein
the period determiner determines the first period length on the basis of the states of wireless links of the first wireless communication apparatus and the second wireless communication apparatus.

4. The wireless terminal according to claim 1, further comprising a displaying unit and an input unit.

5. A first wireless communication apparatus provided in a wireless terminal, the first wireless communication apparatus comprising:
a unit transmitting a beacon including information on a first period length,
wherein the first wireless communication apparatus is connected to a first wireless network,
the first wireless communication apparatus is in a first state during at least a period of the first period length from a transmission timing of the beacon, enables to transition to a second state after elapse of the period until a next transmission timing of the beacon,
the first state is a state in which the first wireless communication apparatus enables to receive data from the first wireless network and the second state is a state in which the first wireless communication apparatus is restricted to receive the data from the first wireless network, and consumption power of the first wireless communication apparatus in the second state is lower than that of the first wireless communication apparatus in the first state,
the wireless terminal relays communication between the first wireless communication apparatus and a second wireless communication apparatus provided in the wireless terminal, the second wireless communication apparatus being connected to a second wireless network different from the first wireless network, and the first period length is determined based on a state of a wireless link of the second wireless communication apparatus to the second wireless network.

6. A wireless terminal comprising:
the first wireless communication apparatus according to claim 5; and
a setting unit configured to set information to determine the first period length.

7. A wireless terminal comprising:
the first wireless communication apparatus according to claim 5;
the second wireless communication apparatus;
a first acquiring unit configured to acquire a state of a wireless link of the first wireless communication apparatus; a second acquiring unit to acquire the state of the wireless link of the second wireless communication apparatus; and a determiner configured to determine the first period length on the basis of the state of the first wireless communication apparatus and the state of the second wireless communication apparatus.

8. A wireless terminal comprising:
the first wireless communication apparatus according to claim 5;
the second wireless communication apparatus;
a second acquiring unit to acquire the state of the wireless link of the second wireless communication apparatus connected to the second wireless network; and
a determiner to determine the first period length based on the state of the wireless link of the second wireless communication apparatus as acquired by the second acquiring unit.

9. The wireless terminal according to claim 8, further comprising a displaying unit and an input unit.

* * * * *